J. WAGNER, Jr.
METAL CUTTING TOOL.
APPLICATION FILED MAY 7, 1921.

1,430,604.

Patented Oct. 3, 1922.
2 SHEETS—SHEET 1.

J. WAGNER, Jr.
METAL CUTTING TOOL.
APPLICATION FILED MAY 7, 1921.
1,430,604.
Patented Oct. 3, 1922.
2 SHEETS—SHEET 2.
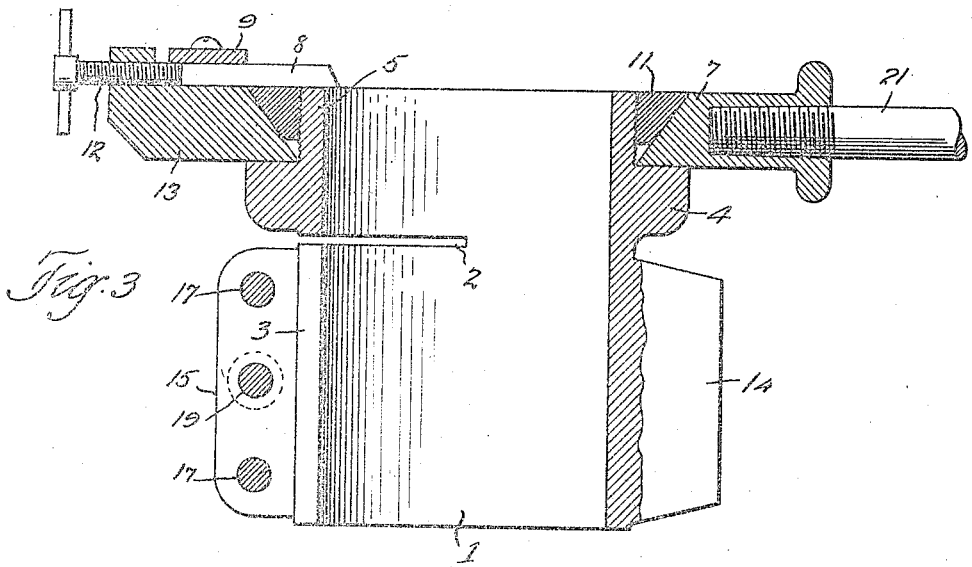
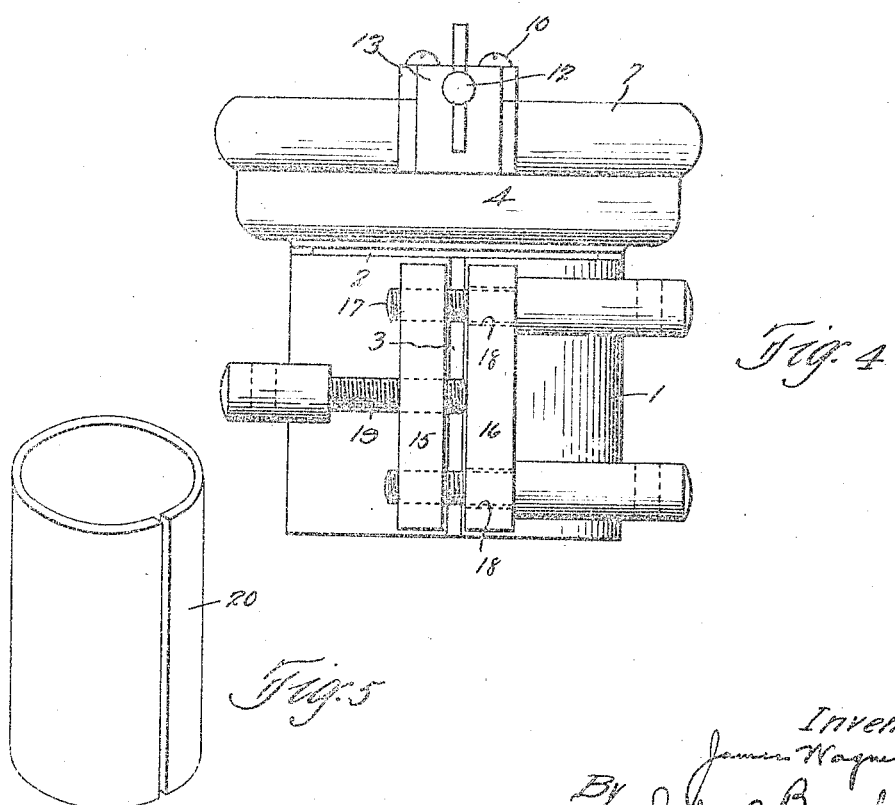

Patented Oct. 3, 1922.

1,430,604

UNITED STATES PATENT OFFICE.

JAMES WAGNER, JR., OF CLEVELAND, OHIO.

METAL-CUTTING TOOL.

Application filed May 7, 1921. Serial No. 467,566.

*To all whom it may concern:*

Be it known that I, JAMES WAGNER, Jr., a citizen of the United States, residing at Cleveland, in the county of Cuyahoga and State of Ohio, have invented certain new and useful Improvements in Metal-Cutting Tools, of which the following is a specification.

This invention is a metal cutting tool particularly adapted for cutting or enlarging the piston ring grooves in pistons of internal combustion and other engines, and will be found particularly useful for enlarging grooves so that over-size rings may be fitted therein.

Figure 1:
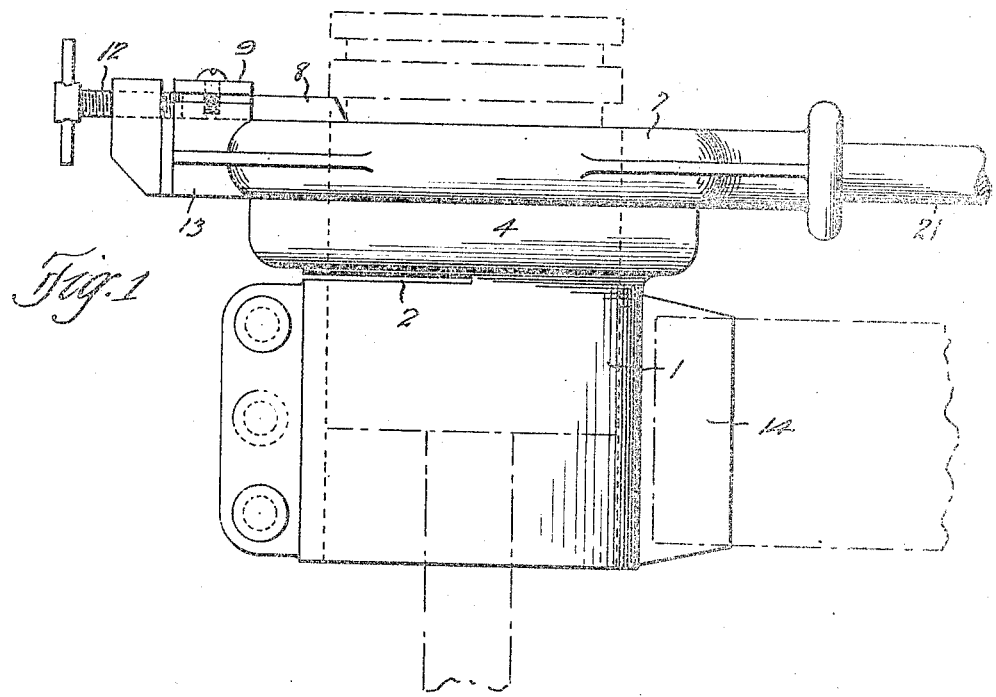
Figure 2:
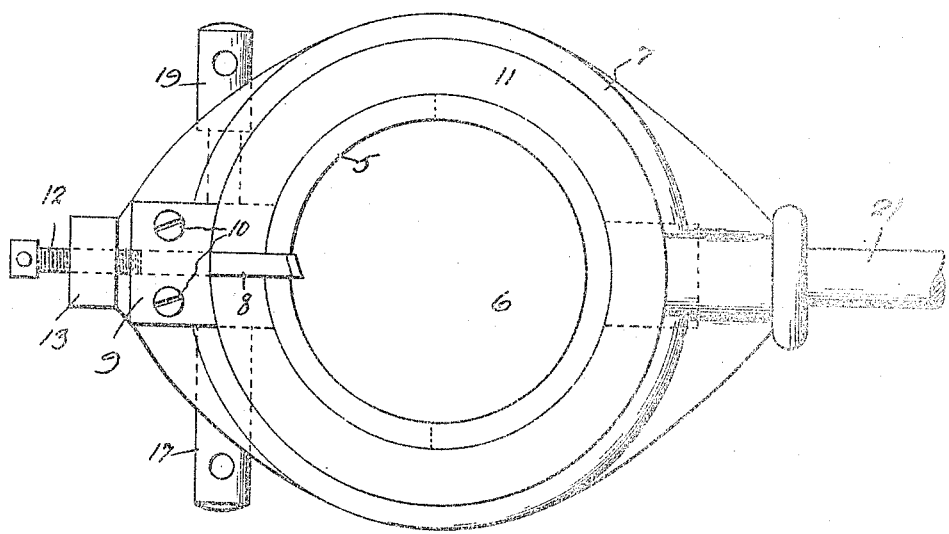

The invention will be understood from the following description in connection with the accompanying drawings in which Fig. 1 is a side elevation of the tool showing a piston in dotted lines. Fig. 2 is a top plan. Fig. 3 is a vertical section. Fig. 4 is a side elevation from the left of Fig. 1. Fig. 5 is a detail in perspective of a spacer which can be used with the device so that it may operate on small sized pistons.

Referring specifically to the drawings 1 indicates a cylindrical body or sleeve the lower part of which is split or slotted lengthwise as indicated at 3 and crosswise as indicated at 2, the cross slot being about half the diameter of the cylinder. Above the slot 2 the sleeve has an external shoulder 4 above which is a reduced threaded extension 5.

A rotary tool ring or carrier 7 is mounted to turn on the shoulder 4, and this carries a radially extending cutting blade 8 clamped thereon by a plate 9 and screws 10. The inner edge of the ring 7 is bevelled, and a conical ring 11 is screwed on the extension 5 and has a beveled face which fits against the incline of the ring 7, as clearly shown in Fig. 3. This accurately centers the ring 7 and holds it down in place, but the ring 7 can nevertheless be turned to effect the cutting operation. The plate 8 may be set in by a screw 12 working through a boss 13 on the ring.

A lug 14 is cast on one side of the sleeve 1 so that it may be held in a vise, as indicated by dotted lines in Fig. 1. Lugs 15 and 16 are also cast on the sleeve at opposite edges of the slot 3, and clamping screws 17 are tapped through these lugs to clamp the sleeve on a piston. An expanding screw 19 is also tapped through one of the lugs and presses against the other to open the sleeve so that it may be slipped on pistons of varying sizes.

When a small piston is to be cut, a slotted cuff 20 is placed around the piston and then inserted in the sleeve, and tightened in an obvious manner.

In use, the split sleeve is clamped on the piston in the manner indicated in Fig. 1 with the blade 8 registering with the groove to be cut, and then by turning the member 7 by means of a handle 21 the blade will cut or enlarge the piston ring groove in a quick and serviceable manner; and it will be noted that the piston may be clamped in the sleeve without removing the connecting rod.

Although particularly useful for cutting grooves in pistons, the device may be used for cutting grooves in other cylindrical articles, and no limitation with respect to the particular construction of the parts, or the particular use of the device, is implied.

I claim:

1. A tool for cutting a groove in a cylindrical article, comprising a clamping sleeve in which the article may be held, said sleeve having a shoulder around the same near one end thereof, a rotatable ring fitting around said end and resting against said shoulder and adapted to be turned around the sleeve, a retaining ring screwed on the said end of the sleeve and against said ring, and a cutting blade mounted on the ring and projecting inwardly across the said end of the sleeve in position to cut a groove in an article held in the sleeve.

2. A tool for cutting a groove in a cylindrical article, comprising a clamping sleeve in which the article may be held, said sleeve having a shoulder around the same, a rotatable ring resting against said shoulder and adapted to be turned around the sleeve, the inner edge of said ring being beveled, a retaining ring screwed on the end of the sleeve and having an outer beveled edge bearing against said ring, and a cutting blade mounted on the ring and projecting inwardly across the end of the wall of the sleeve in position to cut a groove in the sleeve, and means to adjust said blade inwardly.

In testimony whereof, I affix my signature in presence of two witnesses.

JAMES WAGNER, Jr.

Witnesses:
JOHN A. BOMMHARDT,
BESSIE F. POLLAK.